(12) United States Patent
Etlender

(10) Patent No.: US 6,668,576 B1
(45) Date of Patent: Dec. 30, 2003

(54) METHOD AND DEVICE FOR CONTINUOUS PRODUCTION OF ICE-SOLUTION SUSPENSION

(75) Inventor: Semyon Etlender, Beer Sheva (IL)

(73) Assignee: Fluid Ice Systems, Beer Sheva (IL)

( * ) Notice: Subject to any disclaimer, the term of this patent is extended or adjusted under 35 U.S.C. 154(b) by 0 days.

(21) Appl. No.: 10/069,221

(22) PCT Filed: Aug. 7, 2000

(86) PCT No.: PCT/IL00/00476

§ 371 (c)(1),
(2), (4) Date: Jul. 1, 2002

(87) PCT Pub. No.: WO01/14038

PCT Pub. Date: Mar. 1, 2001

(30) Foreign Application Priority Data

Aug. 22, 1999 (IL) .................................................. 131518

(51) Int. Cl.[7] ................................................. F25C 1/00
(52) U.S. Cl. ............................................ 62/330; 62/342
(58) Field of Search ............................ 62/541, 544, 66, 62/67, 123, 330, 342

(56) References Cited

U.S. PATENT DOCUMENTS

| 3,328,972 A | 7/1967 | Svanoe |
| 3,347,058 A | 10/1967 | Svanoe |
| 4,551,159 A | 11/1985 | Goldstein |
| 4,912,935 A | 4/1990 | Goldstein |
| 5,383,342 A | 1/1995 | El-Boher et al. |
| 5,884,501 A | 3/1999 | Goldstein |
| 6,056,046 A | 5/2000 | Goldstein |

Primary Examiner—William E. Tapolcai
(74) Attorney, Agent, or Firm—Nixon & Vandehye P.C.

(57) ABSTRACT

A method of continuous production of ice-solution suspension wherein the solution being continuously fed (7) to the processing zone (6) is overcooled: then, the turbulization (14) is performed in the overcooled solution; as a result, ice microcrystalls are formed in the solution; after that, the formed ice-solution suspension is removed (8) from the processing zone, in doing this, the said turbulization is chosen with such intensity that the formed ice microcrystalls mass transfer balance will be positive, considering their adhesion on the internal surfaces in processing zone. An installation (1) for continuous production of ice-solution suspension is also described.

3 Claims, 3 Drawing Sheets

METHOD AND DEVICE FOR CONTINUOUS PRODUCTION OF ICE-SOLUTION SUSPENSION

This application is the US national phase of international application PCT/IL00/00476 filed Aug. 7, 2000, which designated the US.

The invention relates to the refrigeration and, more particularly, to the continuous production of ice, mainly, water ice suspension in various solutions, for example, in various drinks, coolants in air conditioning systems, seawater, etc., using ice generators.

Various methods and devices for production of ice in solutions using ice generators are known (for example, U.S. Pat. Nos. 4,551,159, 4,936,114). Generally, by all these methods and devices it is possible to produce a sludge ice.

A disadvantage of sludge ice as a useful product is the difficulty of its delivery to the destination, because it needs the special transport and reloading facilities.

This disadvantage can be eliminated by the known method and device for continuous production of ice-solution suspension (liquid ice) using an ice generator (U.S. Pat. No. 5,383,342 of Ontec Ltd.), then the obtained suspension can be easily transported using conventional equipment (piping and pumps).

According to this method, the solution flow passes along a cooling element of ice generator to cool down the solution and form ice microcrystalls on the cooling surface of this element. The ice microcrystalls formed on the cooling surface are removed from this surface into the solution before any ice wall arises. The removed ice microcrystalls dispersed and dissipated uniformly throughout the entire volume of the solution flow thus form the ice suspension in the solution. This suspension leaves the ice generator as continues flow, which is suitable, as the Company advertised, for transport via conventional pipelines.

The device for accomplishment of this method is the ice generator, which has the channel for passing the solution. The cooling element that has the cooling surface intended for interaction with solution is located along the channel. The device contains means for removal of ice microcrystalls from the cooling surface of this element, which includes scrapers attached to the shalt mounted inside the channel.

However, the proposed method and device for its accomplishment have a number of drawbacks, namely:

Large quantities of ice microcrystalls in solution actively adhere to the ice generator internals (shaft, elements connecting scrapers to the shaft etc.) located near the channel axis, that causes negative mass-transfer balance of the formed ice microcrystalls. The mass-transfer balance—means the difference between the mass of ice removed from the processing zone in a unit of time and the mass of ice adhered to the internal elements in a unit of time. In applicant's opinion, the said active adhesion caused by a relatively small flow turbulization in the zones near these internal elements. The said adhesion causes the keeping and accumulation of ice inside the channel until the channel is blocked up.

Periodical dysfunction of the regular microcrystalls removal from the cooling surface, since the ice wall arises on the cooling surface because of device process parameters fluctuations (increase of the initial solution temperature, local decrease of solution concentration, decrease of the refrigerant boiling point etc.) that causes the increase of the thermal resistance and, as a result, an additional loss of energy; and so this can fail the device.

Relatively low efficiency of utilization the heat flow transferred across the cooling element, since when the ice microcrystalls dispersed and dissipated uniformly throughout the entire volume of the solution flow, the most of them are away from the cooling surface. Consequently, the thermal resistance to the heat flow, which is being transferred during crystallization, considerably rises. In one's turn, relatively low efficiency of the heat flow utilization requires increased specific energy consumption.

The object of this invention is to provide a method and a device for continuous production of ice-solution suspension using an ice generator, which could allow to arrange formation of ice microcrystalls in solution in such a manner, and provide such solution conditions, that the quantity of the ice microcrystalls adhered on the ice generator internals will be significantly decreased providing the positive balance of the formed ice microcrystalls mass transfer and prevent the ice wall formation on the cooling surface and thus reduce energy loss and exclude the possibility of the device operation failure.

The set problem is solved by the following way: the solution, continuously fed to the processing zone, is overcooled; then the turbulization is performed in the overcooled solution; as a result, ice microcrystalls are formed in the solution; after that the formed ice-solution suspension is removed from the processing zone; by this, the said turbulization is chosen with such intensity that the formed ice microcrystalls mass transfer balance will be positive, considering their adhesion on the internal surfaces in processing zone.

The set problem is also solved by the way that the device for implementation of this method is the ice generator which has a channel having an inlet for solution feed and an outlet for ice-solution suspension evacuation, and it also includes a cooling element having a cooling surface intended for interaction with solution. The device also includes means for removal of the formed overcooled solution from the area of its direct thermal contact with the cooling surface, and means for solution turbulization.

The essence of the invention is illustrated by the following drawings:

FIG. 1 schematically shows the device according to this invention as its longitudinal section.

Figure 1:
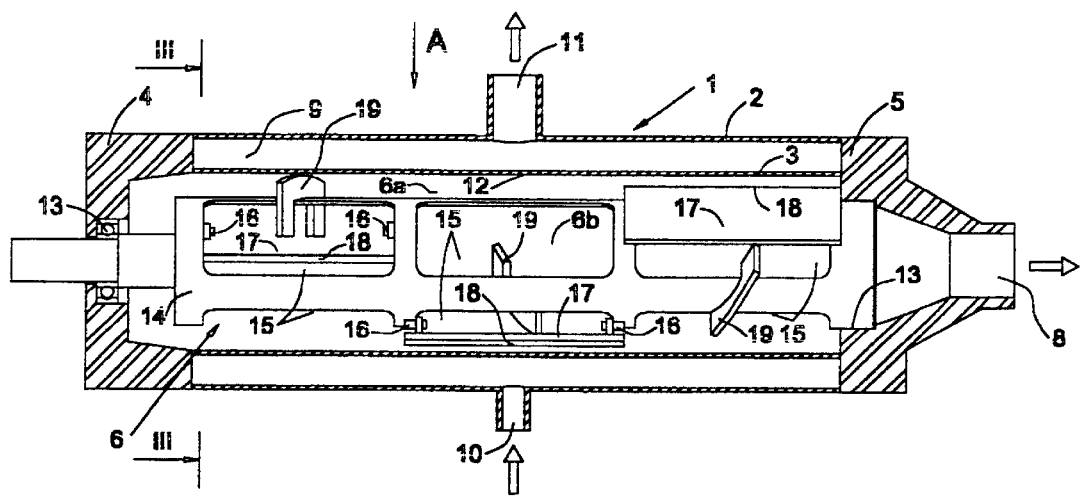
Figure 2:
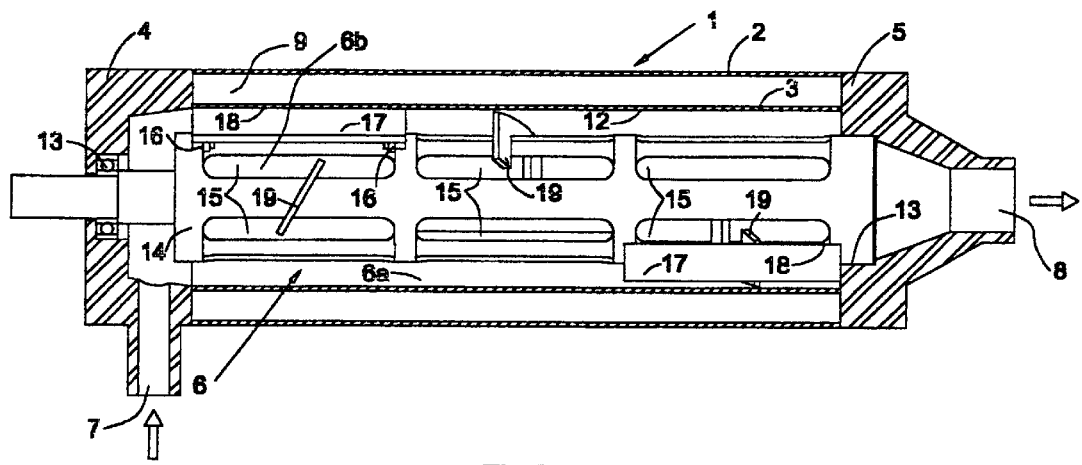
FIG. 2 is the sectional plan view in the direction of arrow A in FIG. 1.
Figure 3:
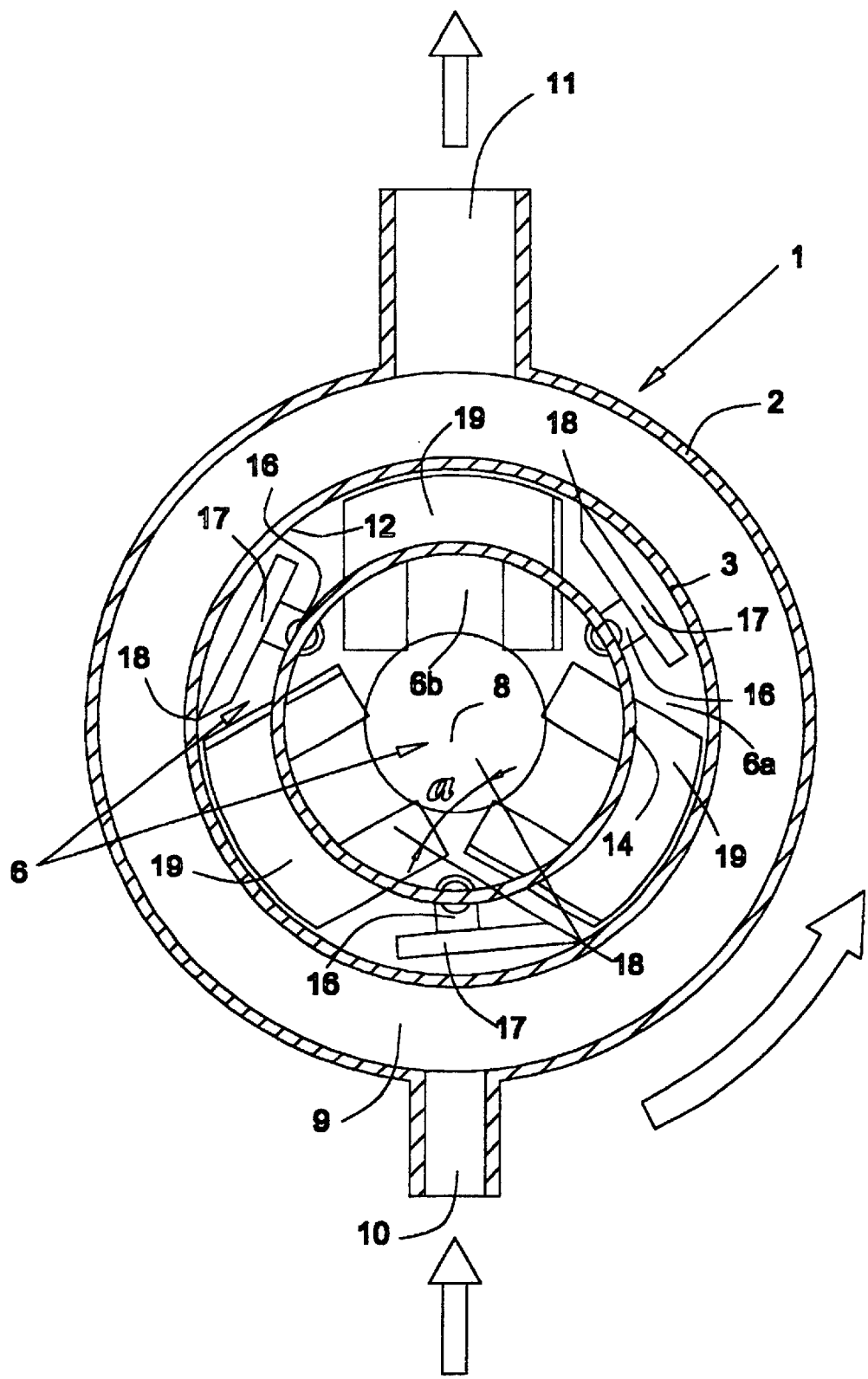
FIG. 3 is the enlarged sectional profile view taken on line III—III in FIG. 1.

The device for continuous production of ice-solution suspension is the ice generator 1 (FIG. 1). It consists of the external shell 2, the internal shell 3 coaxial placed into the shell 2, and the covers 4 and 5 which close these shells on the sides of the shell faces. The shell 3 is the wall of the channel 6 for passing and processing of the solution inside the channel. The cover 4 has the inlet 7 for the initial solution feed. The outlet 8 in the cover 5 serves for the ice solution evacuation. The ring-shaped hollow 9 formed by the shells 2 and 3 is communicated with conventional refrigerating plant (not shown) via the socket 10 for supply of a cool liquid refrigerant and via the socket 11 for evacuation of the refrigerant vapor produced by the boiling refrigerant. The internal surface 12 of the shell 3 is the cooling surface of the cooling element formed by the shells 2 and 3 connected with each other. The hollow cylindrical rotor 14 driven by any conventional drive (not shown) is mounted axially inside the channel 6 in the supports 13. The rotor 14 divides the channel 6 in two hollows: the hollow 6a located between the shell 3 and the rotor 14, and the hollow 6b which is the internal rotor hollow. The rotor 14 is perforated by window-holes 15 communicating the hollows 6a and 6b with each other. The number, form and dimensions of the windows 15 chosen both by calculation and experimentally based upon conditions when using these windows enable to create such a rate of the solution turbulization that, in the operating time of this device, the formed ice microcrystalls mass transfer balance should be positive, considering the microcrystalls adhesion to the internal surfaces in processing zone, and enable passing suspension through these windows. The guiding blades 17 designed for removal the overcooled solution from the area of its direct thermal contact with the cooling surface, are attached to the rotor 14 using intermediate elements 16. The guiding blades 17 are inclined at an angle α from the radial direction towards the rotor rotation side (shown by arrow). In certain versions, other elements, e.g. hollow worms, can apply instead of the blades 17. The blades 17 have the scrapers 18 on their ends, which cover the whole length of the cooling surface, and are designed to remove the ice microcrystalls from the cooling surface 12. One of the versions can be provided with no scrapers 18, but in this case, the accuracy of the ice generator manufacture must be so high that the probability of ice formation the cooling surface in the ice generator during its operation is excluded. The buffle plates 19 are attached to the rotor 14 in the hollow 6a; they are placed separately over the rotor length and over its circle, and are designed for reducing the motion velocity of the ice microcrystalls in the solution flow. One of the versions may exclude the baffle plates 19.

The device operation for the proposed method is described below.

As a preliminary, e.g. during factory test, the minimum rates of turbulization for specific ice generator are determined for the different solutions in use, which provide positive mass transfer balance of the ice microcrystalls formed during the ice generator operation. This can be determined using any known method. For example, after a preset testing time of the ice generator regular operation it is stopped, the solution is discharged and the ice remaining inside the ice generator is weighed. After that, the test is repeated when the said time is increased. During the test, the turbulization is increased until the weight of the ice remaining at the consecutive measurement is lower then or equal to the weight of the ice remaining at the previous measurement.

Figure 4:
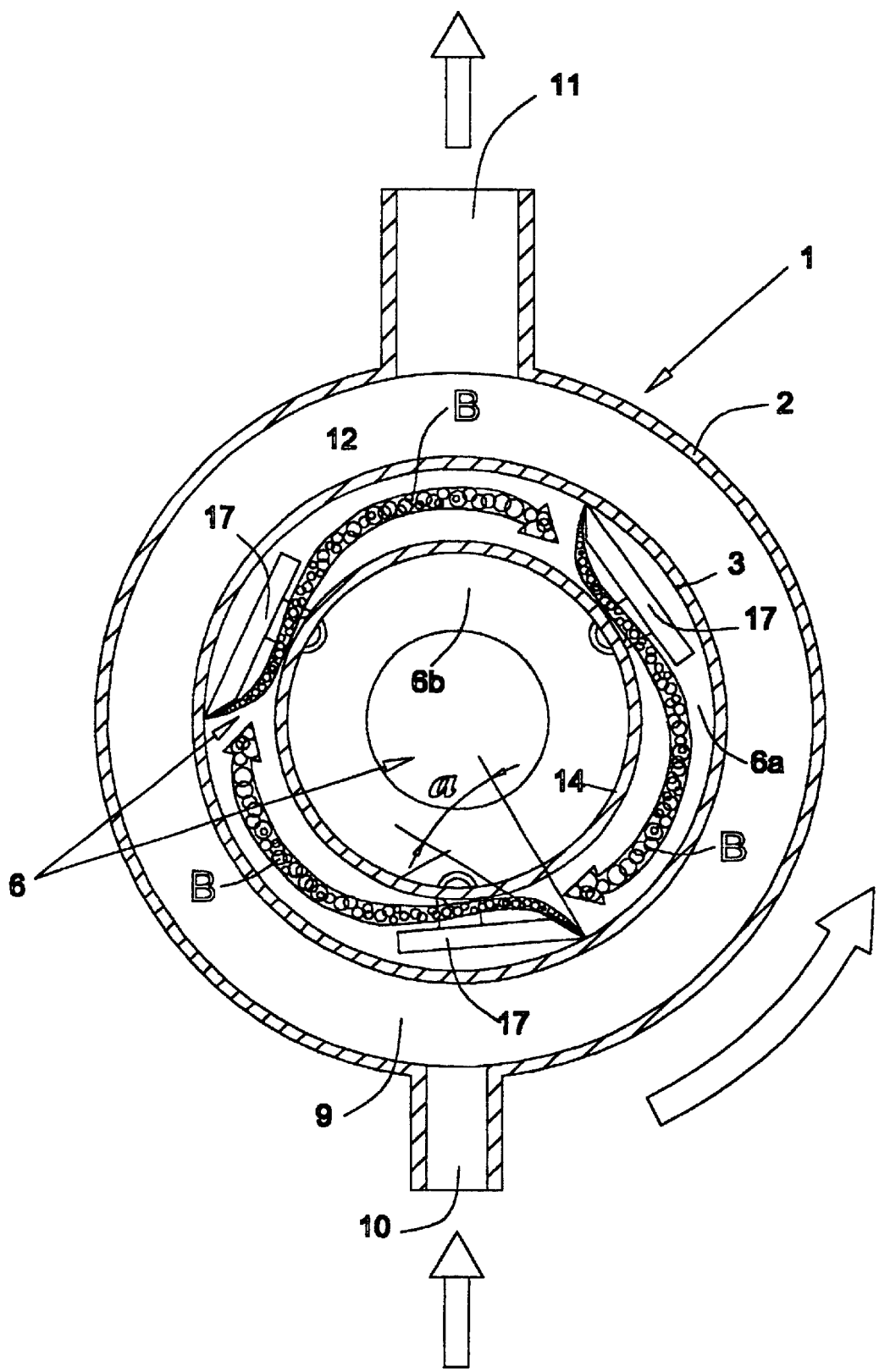
FIG. 4 is the enlarged schematic section on line III—III in FIG. 1 with the schema of the overcooled solution movement from the cooling surface to the rotor.

In operation of the ice generator, the initial solution having a below-zero cryoscopic temperature is fed continuously via the inlet 7 into the channel 6 wherein the solution is processed. The ice-solution suspension formed as a processing result leaves the channel 6 via the outlet 8. During processing the cold liquid refrigerant is fed from a refrigerating plant via the socket 10 into the ring-shaped hollow 9, where it boils at a constant temperature removing heat from the cooling surface 12 across the channel wall. The vapor formed by the boiling refrigerant is evacuated via the socket 11. The cooling surface has a direct contact with the solution flow and is providing the overcooling of the solution layer, which is in the area of direct thermal contact of the solution with the cooling surface. The rotor 14 rotates at a specific speed determined during preliminary test. The turbulization of solution, created when the rotor runs at this speed, provides the positive mass transfer balance of the ice microcrystalls. When the rotor 14 rotated, the guiding blades 17 remove the overcooled solution from the cooling surface 12 to the rotor 14 in direction of arrows B (see FIG.4). The ice microcrystalls which are formed accidentally on the cooling surface are constantly removed from it into the solution by the scrapers 18. Most of ice microcrystalls created during turbulization of the overcooled solution are held in the ring-shaped hollow 6a because their movement through the windows 15 into the internal hollow 6b of the rotor 14 is difficult when the rotor runs. The motion velocity of ice microcrystalls in the solution is reduced by means of the baffle plates 19. The holding of the formed ice microcrystalls in the ring-shaped hollow 6a, i.e. near to the cooling surface 12, and the deceleration of their motion in the flow allow, respectively, to increase the intensity of crystallization due to decrease of the thermal resistance to the heat flow, which is removed during crystallization, and to extend the dwell time of the ice microcrystalls in the intensive crystallization zone. This increases the useful efficiency of the heat flow, and therefore, it reduces the specific energy consumption. The formed ice-solution suspension leaves the channel 6 via the outlet 8.

For certain implementations of the invention it is expedient to realize turbulization of the solutions in the cavitation mode, in spite of accompanying wearing of device elements, because of the sharp drop of pressure in cavities, water steam evaporates and the gases, dissolved in the solution, educe, that causes a large-scale creation of crystallization centers and subsequent growth of ice microcrystalls. In addition, that intensifies crystallization process because of additional cooling effect, created by water evaporating, and improves dispersion of suspension ice-solution.

The present invention allows to eliminate the possibility of ice formation on the cooling surface with any device process parameter fluctuations and, as a result, to eliminate an additional loss of energy and a probable failure of the device.

Further, the invention allows to additionally reduce adhesion of ice microcrystalls to the internal elements of the ice generator because such elements are not in the internal hollow 6b of the rotor, i.e. in the zone located close to the channel axis, where, as said above, the most active adhesion occurs.

There are possible various design versions of this invention that differ from those described above in the used method of solution overcooling, e.g. overcooling the solution before it is fed to the processing zone, in other operations of this method, in design implementation of individual elements and units, in their interconnection etc.

What is claimed is:

1. An ice generator device for continuous production of ice-solution suspension comprising:
   a channel having an inlet for solution feed and an outlet for ice-solution suspension leaving;
   a cooling element having a cooling surface intended for interaction with the solution;
   a means for removal of the formed overcooled solution from the area of its direct thermal contact with the cooling surface, and
   means for solution turbulization of the overcooled solution, wherein the intensity of the turbulization is such that a positive mass transfer balance results,
   wherein the channel wall surface serves as a cooling surface; the channel has a cylindrical form; the means for solution turbulization is a hollow rotor placed coaxially to the channel and perforated by holes intended for passing the solution into the rotor hollow and back; and means for removal of the formed overcooled solution from the area of the direct thermal contact is guiding blades attached to the rotor, which are placed in said area inclined from a radial direction towards the rotor rotation side.

2. Device according to claim 1 wherein the guiding blades have scrapers on their ends to remove ice microcrystalls from the cooling surface.

3. Device according to claim 1 wherein baffle plates are mounted in several sections of said channel and are designed for reducing the motion velocity of the ice microcrystalls in the solution flow.

* * * * *